(12) United States Patent
Sunder et al.

(10) Patent No.: US 6,357,728 B1
(45) Date of Patent: Mar. 19, 2002

(54) OPTIMAL CORRUGATED STRUCTURED PACKING

(75) Inventors: Swaminathan Sunder; Herbert Charles Klotz, both of Allentown; George Amir Meski, Whitehall, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/270,310

(22) Filed: Mar. 15, 1999

(51) Int. Cl.$^7$ .................................................. B01F 3/04
(52) U.S. Cl. .................................................... 261/112.2
(58) Field of Search ....................................... 261/112.2

(56) References Cited

U.S. PATENT DOCUMENTS

| | | | |
|---|---|---|---|
| 4,296,050 A | 10/1981 | Meier | 261/112 |
| 4,836,836 A | 6/1989 | Bennett et al. | 62/22 |
| 4,929,399 A * | 5/1990 | Lockett et al. | 261/112.2 |
| 5,100,448 A | 3/1992 | Lockett et al. | 62/24 |
| 5,419,136 A | 5/1995 | McKeigue | 62/24 |
| 5,613,374 A | 3/1997 | Rohde et al. | 62/643 |
| 5,616,289 A * | 4/1997 | Maeda | 261/112.2 |
| 5,644,932 A | 7/1997 | Dunbobbin et al. | 62/640 |
| 5,722,258 A * | 3/1998 | Aitken | 261/112.2 |
| 5,730,000 A * | 3/1998 | Sunder et al. | 261/112.2 |
| 5,876,638 A * | 3/1999 | Sunder et al. | 261/112.2 |

* cited by examiner

*Primary Examiner*—C. Scott Bushey
(74) *Attorney, Agent, or Firm*—Willard Jones, II

(57) ABSTRACT

A structured packing having a surface area density in the range of about 500 m$^2$/m$^3$ to about 675 m$^2$/m$^3$ includes a plurality of corrugated plates disposed in vertically parallel relation. Each plate has at least one aperture and a plurality of regularly spaced and substantially parallel corrugations disposed in crisscrossing relation to the corrugations of an adjacent plate. The apertures have an equivalent diameter of less than about 4 millimeters but greater than about 2 millimeters. The corrugations have a corrugation angle ( ) relative to horizontal in the range of about 40° to about 60°. Each corrugation, when approximated to be substantially a triangular cross-section, has an included angle ($\beta$) defined by two sides of the corrugation in the range of about 90° to about 100°. The structured packing is used in exchange columns for exchanging heat and/or mass between a first phase and a second phase in processes such as cryogenic air separation. A method also is provided for installing the structured packing in an exchange column

17 Claims, 4 Drawing Sheets

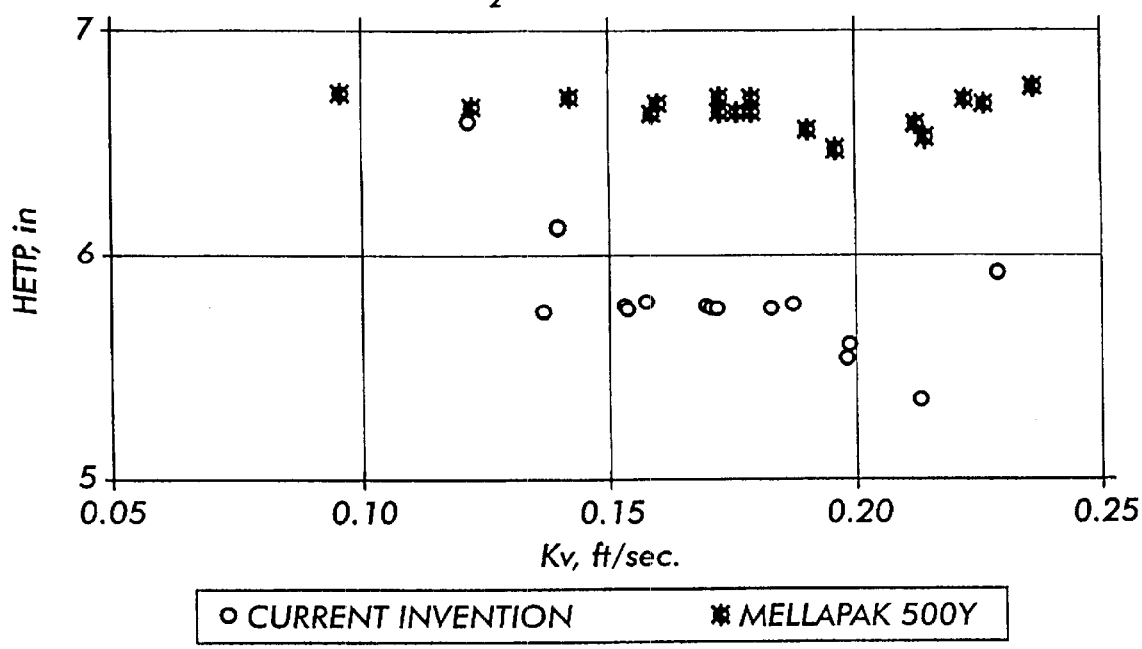
FIG.6 HETP vs. Kv
Ar/$O_2$, L/V=1, P=30 psia.
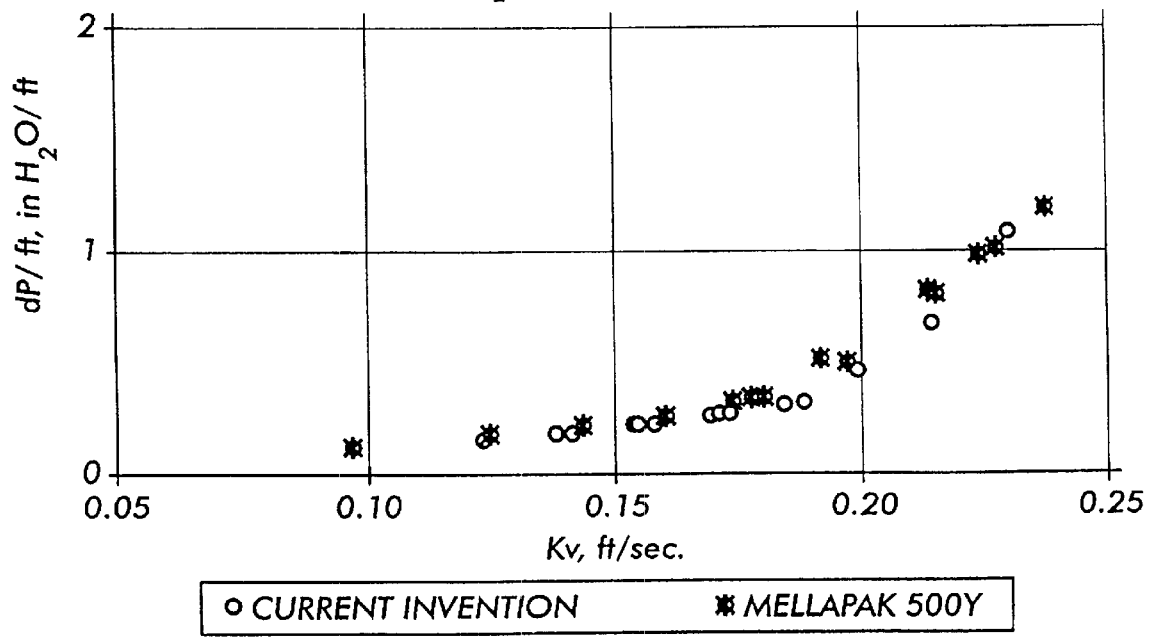
FIG.7 PRESSURE DROP vs. Kv
Ar/$O_2$, L/V=1, P=30 psia.

OPTIMAL CORRUGATED STRUCTURED PACKING

CROSS-REFERENCE TO RELATED APPLICATIONS

Not Applicable

STATEMENT REGARDING FEDERALLY SPONSORED RESEARCH FOR DEVELOPMENT

Not Applicable

BACKGROUND OF THE INVENTION

The present invention relates to corrugated structured packing and methods for installing such packing in an exchange column to provide optimum performance. The structured packing has particular application in exchange columns, especially in cryogenic air separation processes, although it also may be used in other heat and/or mass transfer processes that can utilize structured packing.

The term, "column", as used herein, means a distillation or fractionation column or zone, ie., a column or zone wherein liquid and vapor phases are countercurrently contacted to effect separation of a fluid mixture, such as by contacting of the vapor and liquid phases on packing elements or on a series of vertically-spaced trays or plates mounted within the column.

The term "column section" (or "section") means a zone in a column filling the column diameter. The top or bottom of a particular section or zone ends at the liquid and vapor distributors respectively.

The term "packing" means solid or hollow bodies of predetermined size, shape, and configuration used as column internals to provide surface area for the liquid to allow mass transfer at the liquid-vapor interface during countercurrent flow of two phases. Two broad classes of packings are "random" and "structured".

"Random packing" means packing wherein individual members do not have any particular orientation relative to each other or to the column axis. Random packings are small, hollow structures with large surface area per unit volume that are loaded at random into a column.

"Structured packing" means packing wherein individual members have specific orientation relative to each other and to the column axis. Structured packings usually are made of thin metal foil, expanded metal or woven wire screen stacked in layers or as spiral windings.

The term "surface area density" means the surface area of the structured packing per unit volume of the structured packing, and usually is expressed in terms of $m^2/m^3$ of the volume occupied by the packing.

In processes such as distillation or direct contact cooling, it is advantageous to use structured packing to promote heat and mass transfer between counter-flowing liquid and vapor streams. Structured packing, when compared with random packing or trays, offers the benefits of higher efficiency for heat and mass transfer with lower pressure drop. It also has more predictable performance than random packing.

Cryogenic separation of air is carried out by passing liquid and vapor in countercurrent contact through a distillation column. A vapor phase of the mixture ascends with an ever increasing concentration of the more volatile components (e.g., nitrogen) while a liquid phase of the mixture descends with an ever increasing concentration of the less volatile components (e.g., oxygen). Various packings or trays may be used to bring the liquid and gaseous phases of the mixture into contact to accomplish mass transfer between the phases.

There are many processes for the separation of air by cryogenic distillation into its components (i.e., nitrogen, oxygen, argon, etc.). A typical cryogenic air separation unit 10 is shown schematically in FIG. 1. High pressure feed air 1 is fed into the base of a high pressure column 2. Within the high pressure column, the air is separated into nitrogen-enriched vapor and oxygen-enriched liquid. The oxygen-enriched liquid 3 is fed from the high pressure column 2 into a low pressure column 4. Nitrogen-enriched vapor 5 is passed into a condenser 6 where it is condensed against boiling oxygen which provides reboil to the low pressure column. The nitrogen-enriched liquid 7 is partly tapped 8 and is partly fed 9 into the low pressure column as liquid reflux. In the low pressure column, the feeds (3,9) are separated by cryogenic distillation into oxygen-rich and nitrogen-rich components. Structured packing 11 may be used to bring into contact the liquid and gaseous phases of the oxygen and nitrogen to be separated. The nitrogen-rich component is removed as a vapor 12, and the oxygen-rich component is removed as a vapor 13. Alternatively, oxygen-rich component can be removed from a location in the sump surrounding reboiler/condenser 6 as a liquid. A waste stream 14 also is removed from the low pressure column. The low pressure column can be divided into multiple sections. Three such sections with structured packing 11 are shown in FIG. 1 by way of example.

The most commonly used structured packing consists of corrugated sheets of metal or plastic foils (or corrugated mesh cloths) stacked vertically. These foils may have various forms of apertures and/or surface texture features aimed at improving the heat and mass transfer efficiency. An example of this type of structured packing is disclosed in U.S. Pat. No. 4,296,050 (Meier). It also is well-known in the prior art that mesh type packing helps spread liquid efficiently and gives good mass transfer performance, but mesh type packing is much more expensive than most foil type packing.

The separation performance of structured packing often is given in terms of height equivalent to a theoretical plate (HETP). The term "HETP" means the height of packing over which a composition change is achieved which is equivalent to the composition change achieved by a theoretical plate. The term "theoretical plate" means a contact process between vapor and liquid such that the existing vapor and liquid streams are in equilibrium. The smaller the HETP of a particular packing for a specific separation, the more efficient the packing because the height of packing being utilized decreases with the HETP.

U.S. Pat. No 4,836,836 (Bennett et al.) teaches the use of structured packing in cryogenic distillation wherein the power benefits relative to the use of distillation trays is discussed. The teachings of this patent can be applied to all of the packed sections of an air separation plant, although it is most useful in those sections separating argon and oxygen.

U.S. Pat. No. 5,613,374 (Rohde et aL) teaches the use of packing with a surface area density greater than 1,000 $m^2/m^3$ as optimal for the low temperature separation of air using at least one rectification column. While the most commonly available structured packings have a surface area density in the broad range of 125–750 $m^2/m^3$, Rohde et al. teaches a preferred range of 1000–1500 $m^2/m^3$. Although structured packing of such high surface area density could provide an advantage of high mass transfer efficiency leading to a reduction in the heights of distillation columns, there also are several disadvantages. First, the additional surface area would increase the cost of the packing. Second, the high pressure drop associated with the high surf- area density would lead to a reduction in capacity, which would result in a significant increase in the diameter of the distillation columns used for this separation, which would further increase the cost of the system. Finally, the increased diameter, together with the high surface area density, also would limit severely the ability of distillation columns to operate in a turndown mode because of the unavailability of enough liquid during turndown to keep the large surface area of the packing well wetted. The ability to turndown the production capacity of a plant without losing efficiency is a critical requirement of most modern distillation plants.

U.S. Pat. No. 5,100,448 (Lockett et al.) teaches the use of variable surface area density packing within a single distillation column of constant diameter. Different sections within a column can be under very different loading conditions in terms of vapor and liquid velocities, especially if there are vapor or liquid draws or feeds in between the sections. If the surface area density of the packing used in all sections is the same, then the column will be unevenly loaded relative to the maximum capacity in each section. Because of this, the ability to operate the plant in turndown mode can be severely limited. The suggested remedy is to change the surface area density of the packing within various sections (or within one section) of the column while maintaining the diameter constant for the purpose of obtaining uniform loading within a column. The purpose is not to optimize the packing, but to obtain uniform loading in the column. Also, if the column diameter is changed between sections, as is frequently the case, then there is no need to do that which is taught by Lockett, et al.

U.S. Pat. No. 5,419,136 (McKeigue) teaches an analogue of Lockett et al. McKeigue addresses the same situation of multiple packed sections within a constant diameter column which have very different loadings if the same packing is used in all sections. In this situation, the ability of the column to operate in a turndown mode will be limited as in Lockett et al. McKeigue's remedy is to vary the "crimp angle" within sections and/or within subsections of a section. [The term "crimp angle" as defined in McKeigue is the angle that the corrugations make with the vertical. This has a simple relationship to applicant's "corrugation angle" ( ) in the current invention, wherein the corrugation angle is measured relative to the horizontal. Thus, the "crimp angle" in McKeigue is equal to 90° ] McKeigue's purpose is to obtain uniform loading within a column, not to optimize the packing. Also, when the column diameter is changed between sections, as is frequently the case, then there is no need to do that which is taught by McKeigue.

U.S. Pat. No. 5,644,932 (Dunbobbin et al.) teaches the use of two different corrugation angles and "crimp angles" ("included angles" in applicants' terminology) within two packed sections inside a distillation column, wherein the sections have very different vapor and liquid flow rates. The motivation behind Dunbobbin et al. is similar to that in Lockett et al. and McKeigue, namely to design the packings in two sections such that the hydraulic loading capacity of each packing is approached equally. To this end, a new dimensionless parameter 's' is introduced which is defined as the product of the vapor-liquid interfacial stress and the liquid film thickness divided by the surface tension of the liquid. This 's' parameter needs to be maintained within a narrow range. However, very broad ranges of the corrugation and included angles are claimed to yield 's' within the narrow range.

Apertures have been used to improve the efficiency of structured packing. For example, Meier (U.S. Pat. No. 4,296,050) and Huber (U.S. Pat. No. 4,186,159) both state that the apertures in their packing elements are approximately 4 mm in diameter. Most of the major vendors make structured packing with apertures in the range of 4–5 mm. Their apertures occupy not more than 5 to 20% of the total surface area of the element or plate. Also, their corrugations are disposed at an angle of 15° to 60° relative to the vertical, or 30° to 75° relative to the horizontal (i.e., =30° to 75°).

U.S. Pat. No. 4,950,430 (Chen et al.) teaches the use of apertures in the range of 1–2 mm, with several other qualifiers in terms of hole spacing, etc. for an improved packing relative to Meier or Huber. For example, the spacing between the apertures is no greater than 5 mm, and the apertures occupy not more than 20% of the total surface area of the element or plate. In the preferred form, the apertures are round holes, but non-round holes may be used, including ovals, oblongs, elliptical holes, and triangular holes, rectangular holes, narrow slit-type holes, and the like.

U.S. Pat. No. 5,730,000 (Sunder, et al.) and U.S. Pat. No. 5,876,638 (Sunder, et al) disclose a corrugated structured packing element which preferably has a plurality of apertures throughout the element. The open area of the element may be in the range of 5 to 20% and preferably in the range of 8 to 12% of the total area of the element. The surface area density of the element is preferably in the range of 250–1500 $m^2 m^3$, with a most preferred range of 500–1000 $m^2 m^3$. The apertures are circular and have a diameter in the range of 1–5 mm, with a preferred range of 2–4 mm. Alternatively, the holes in the packing are not circular, but have an "equivalent diameter" (calculated as four times the area divided by the perimeter) within the stated ranges of the diameter of the circular apertures. The corrugation angle ( ) is in the range of 20°–70°, with a preferred range of 300–600, and is most preferably 45°. These patents teach the use of a bidirectional surface texture in the form of fine grooves in crisscrossing relation applied on the surface of the corrugated plates of the packing element.

PCT/EP 93/00622 (WO 93/19335) (Kreis) discloses a corrugated structured packing having a surface area density in the range of 350–750 $m^2/m^3$, and a surface area density up to 1200 $m^2/m^3$ or higher for certain applications. Apertures in the corrugated elements may be holes, slits or slots. The apertures occupy 5 to 40%, and preferably around 15 to 20%, of the total surface area of the element or plate.

Different surface textures also have been used to improve the efficiency of structured packing. For example, as U.S. Pat. No. 5,454,988 (Maeda) discloses a packing element having plural continuous, adjacent, meandering, concave/convex channels formed on the surface of a sheet-like base. Numerous other examples of surface texture are found in the prior art, such as in EP 0 337 150 A1 (Lockett).

In contrast to the prior art, the motivation behind the current invention is to optimize the packed sections of a distillation plant by simultaneously varying a plurality of independent parameters (e.g., at least four parameters) in order to minimize the overall cost of the system, without a narrow focus on a single criterion such as height or loading.

It is desired to have a structured packing that shows high performance characteristics for cryogenic applications, such as those used in air separation, and for other heat and/or mass transfer applications.

It is further desired to have a structured packing of the corrugated type which will be optimal for cryogenic distillation, especially for separating and purifying the components of air, such as oxygen, nitrogen and argon.

It is still further desired to have a structured packing of the corrugated type which overcomes many of the difficulties and disadvantages of the prior art to provide better and more advantageous results.

It is still further desired to have an optimal design of a structured packing that operates in an optimal manner, which will result in an air separation process more efficient and/or less expensive per unit quantity of product produced.

It is still further desired to have a more efficient air separation process utilizing an optimal structured packing which is more compact and efficient than the prior art.

It also is further desired to have a method of installing a structured packing in an exchange column which affords better performance than the prior art, and which also overcomes many of the difficulties and disadvantages of the prior to provide better and more advantageous results.

BRIEF SUMMARY OF THE INVENTION

The present invention is an optimal corrugated structured packing, which may be used in one or more sections of an exchange column for exchanging heat and/or mass between a first phase and a second phase in a process, such as cryogenic air separation. The invention also provides methods for installing such a packing in an exchange column to provide optimum performance. In addition, the invention includes processes wherein liquid-vapor contact or liquid-liquid contact are established by at least one structured packing of the type taught herein.

In one embodiment, the structured packing has a surface area density in the range of about 350 $m^2m^3$ to about 800 $m^2/m^3$, and includes a plurality of corrugated plates disposed in vertically parallel relation. Each plate has at least one aperture and a plurality of regularly spaced and substantially parallel corrugations disposed in crisscrossing relation to the corrugations of an adjacent plate. The apertures have an equivalent diameter less than about 4 millimeters but greater than about 2 millimeters. The corrugations have a corrugation angle ( ) relative to horizontal in the range of about 35° to about 65°. Each corrugation, when approximated to be a substantially triangular cross-section, has an included angle ($\beta$) defined by two sides of the corrugation in the range of about 80° to about 110°.

In one variation, the structured packing also includes a surface texture applied on at least a portion of the surface of at least one corrugated plate. The surface texture may be in the form of horizontal striations. Alternately, the surface texture may be a bidirectional surface texture in the form of fine grooves in crisscrossing relation.

In another variation, the apertures create open area in each plate in the range of about 5% to about 20% of the total area of the plate. Alternately, the apertures create open area in each plate in the range of about 8% to about 12% of the total area of the plate.

In yet another variation, the corrugations have a root radius (r) in the range of about 0.1 millimeters to about 3.0 millimeters. Alternately, the root radius may be in the range of about 0.3 millimeters to about 1.0 millimeter.

In another embodiment, the structured packing has a surface area density of about 500 $m^2m^3$ to 675 $m^2m^3$, and includes a plurality of corrugated plates disposed in vertically parallel relation. Each plate has at least one aperture and a plurality of regularly spaced and substantially parallel corrugations disposed in crisscrossing relation to the corrugations of an adjacent plate. The apertures have an equivalent diameter less than about 4 millimeters but greater than about 2 millimeters. The corrugations have a corrugation angle ( ) relative to horizontal in the range of about 400 to about 600. Each corrugation, when approximated to be a substantially triangular cross-section, has an included angle ($\beta$) defined by two sides of the corrugation in the range of about 90° to about 100°.

In one variation, the structured packing also includes a surface texture applied on at least a portion of the surface of at least one corrugated plate. The surface texture may be in the form of horizontal striations. Alternately, the surface texture may be a bidirectional surface texture in the form of fine grooves in crisscrossing relation.

In another variation, the apertures create open area in each plate in the range of about 5% to about 20% of the total area of the plate. Alternately, the apertures create open area in each plate in the range of about 8% to about 12% of the total area of the plate.

In yet another variation, the corrugations have a root radius (r) in the range of about 0.1 millimeters to about 3.0 millimeters. Alternately, the root radius may be in the range of about 0.3 millimeters to about 1.0 millimeter.

Another aspect of the present invention is an exchange column for exchanging heat and/or mass between a first phase and a second phase, the exchange column having at least one structured packing as in any one of the embodiments or variations described above.

Yet another aspect of the present invention is a process for cryogenic air separation comprising contacting vapor and liquid counter-currently in at least one distillation column containing at least one mass transfer zone wherein a liquid-vapor contact is established by at least one structured packing as in any one of the embodiments and variations described above.

Still yet another aspect of the present invention is a process for exchanging mass and/or heat between two liquids, comprising contacting said liquids in at least one exchange column wherein liquid-liquid contact is established by at least one structured packing as in any of the embodiments and variations described above. In one variation of this aspect of the invention, the liquids flow co-currently in the exchange column. In another variation, the liquids flow counter-currently in the exchange column.

Another aspect of the present invention is a packed section in an exchange column, which includes: a first layer of structured packing; and a second layer of structured packing located below the first layer of structured packing, wherein the second layer is rotated at an angle relative to the first layer. The structured packing in the first and second layers may be any one of the embodiments and variations described above. In one variation of this aspect of the invention, the angle is between about 0° and 90°.

The present invention also includes a method of installing the structured packing in an exchange column comprising multiple steps. The first step is to provide an exchange column. The second step is to provide a structured packing having a surface area density in the range of about 350 $m^2/m^3$ to about 800 $m^2/m^3$, comprising a plurality of corrugated plates disposed in vertically parallel relation, each plate having at least one aperture and a plurality of regularly spaced and substantially parallel corrugations disposed in crisscrossing relation to the corrugations of an adjacent plate, wherein the apertures have an equivalent diameter of less than 4 millimeters but greater than about 2 millimeters, and wherein the corrugations have a corrugation angle ( ) relative to horizontal in the range of about 35° to about 65° and each corrugation, when approximated to be a substantially triangular cross-section, has an included angle (β) defined by two sides of the corrugation in the range of about 80° to about 110°. The final step is to install the structured packing in the exchange column.

Another embodiment of the method of installing is similar to the method described above, except that the second step utilizes a structured packing such as that described in the second embodiment ("another embodiment") above, rather than the structured packing of the first embodiment ("one embodiment").

BRIEF DESCRIPTION OF THE DRAWINGS

The invention will now be described by way of example with reference to the accompanying drawings, in which:

FIG. 6 is a graph illustrating the performance of the structured packing of the current invention in comparison to that of a commercially available structured packing in terms of height equivalent to a theoretical plate (HETP) versus vapor velocity ($K_v$) under the conditions noted above the graph; and FIG. 7 is another graph illustrating the performance of the structured packing of the current invention in comparison to the performance of a commercially available structured packing in terms of pressure drop (dP/ft) versus vapor velocity ($K_v$) under the conditions noted above the graph.

DETAILED DESCRIPTION OF THE INVENTION

The cost of cryogenic processes for separating mixtures such as air depends on the efficiency of the contacting devices used. While distillation trays have been in use for over eighty years, structured packing has been introduced and employed increasingly during the last fifteen years because of the advantage it offers in terms of very low pressure drops relative to trays. Although various types of packing have been available during this time, many of the commercially available packings have not been optimal because these packings were developed for separating hydrocarbon mixtures which have very different physical and transport properties.

Figure 1:
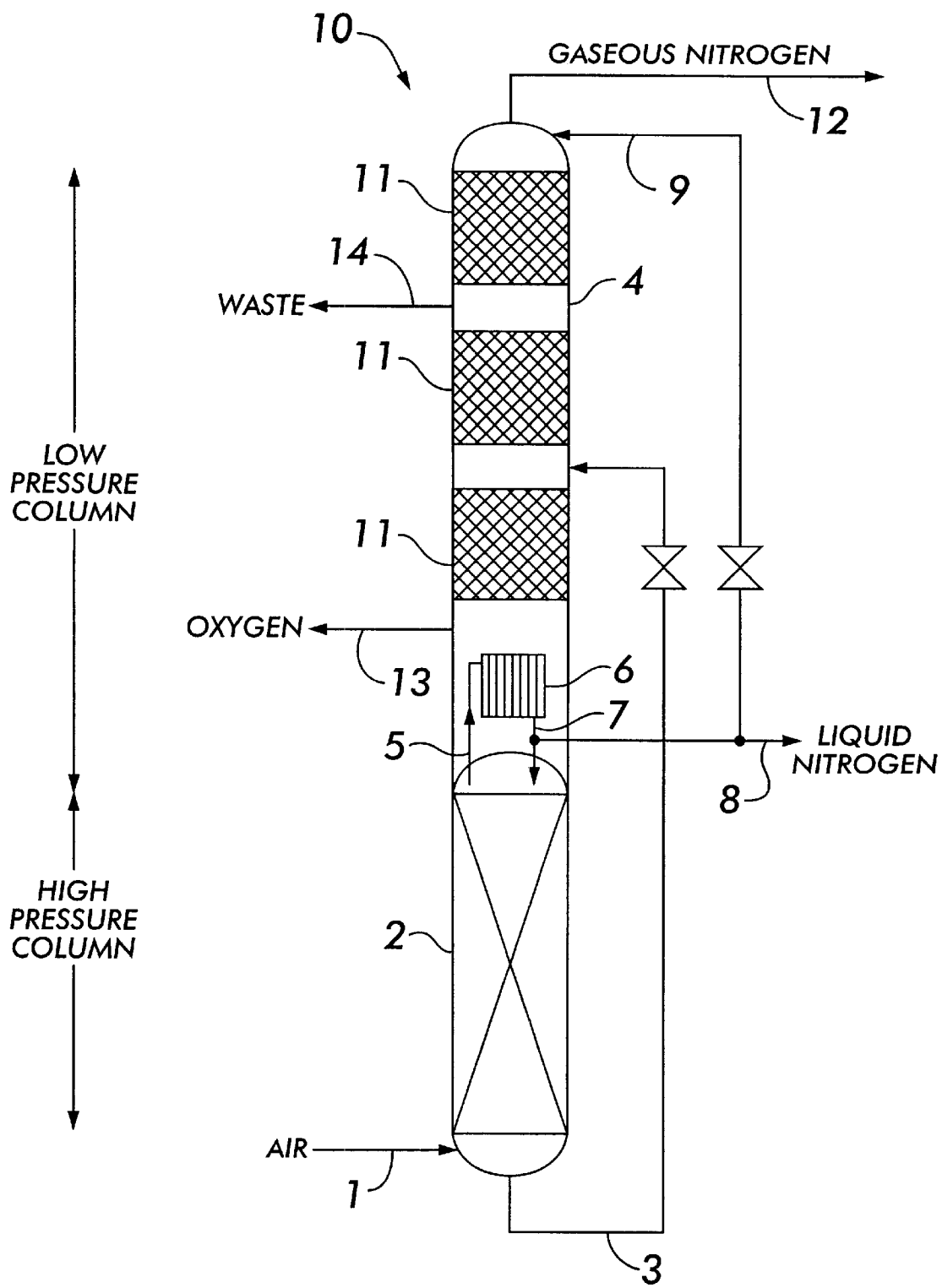
FIG. 1 is a schematic illustration of an air separation unit.
Figure 2:
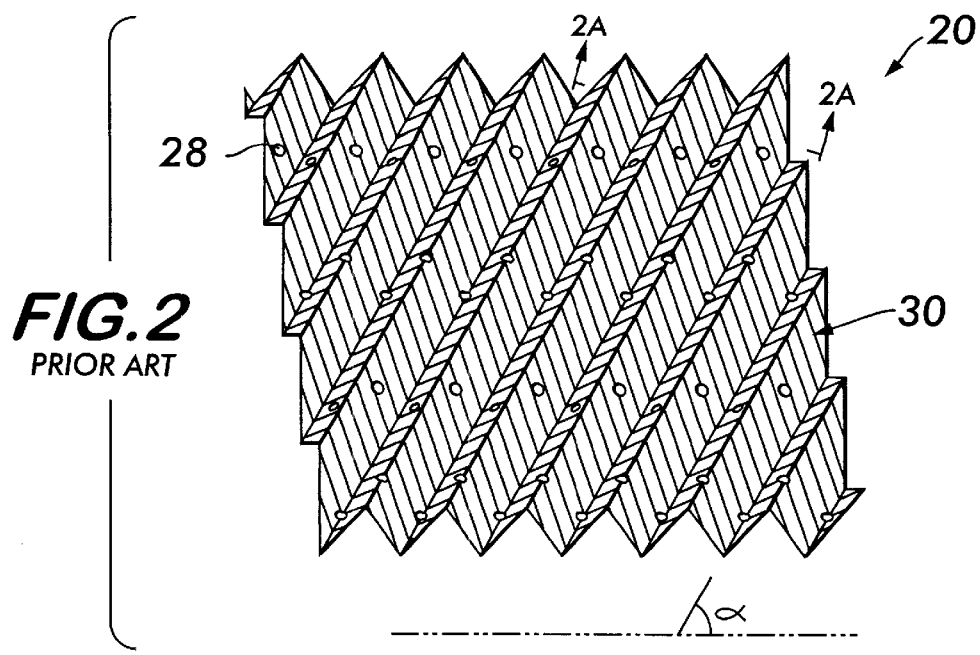
FIG. 2 is a perspective view of a conventional structured packing element.

The conventional technology for using structured packing has been described in various patents pertaining to structured packing that followed U.S. Pat. No. 4,296,050 (Meier), which describes corrugated structured packing and its applications. A basic conventional structured packing element 20 is shown in FIG. 2. Each packing element is made of thin metal foil or other suitable material which is corrugated. A distillation column 40 packed with conventional structured packing is illustrated in FIGS. 5A and 5B.

Figure 2A:
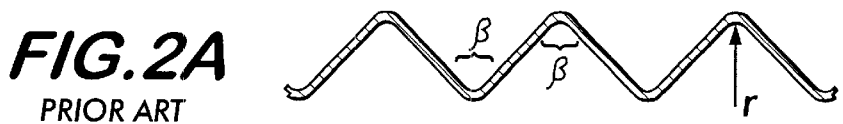
FIG. 2A is a sectional view of the element in FIG. 2 taken along line 2A—2A.
Figure 3:
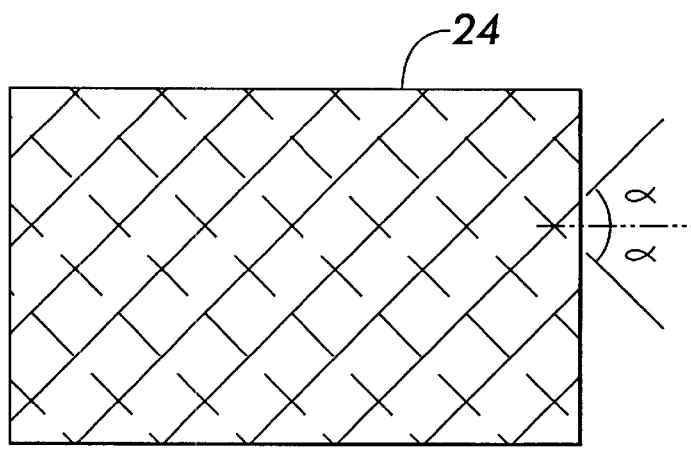
FIG. 3 is a schematic diagram illustrating the crisscrossing arrangement of adjacent elements in conventional structured packing.

A typical structured packing employs vertically-oriented corrugated packing sheets or elements 20 such as that in FIG. 2 wherein the corrugations are arranged at an angle ( ) to the horizontal. Each element is positioned such that its corrugation direction is reversed from the corrugation direction of its adjacent packing sheet, as illustrated in FIG. 3. (The solid diagonal lines represent the corrugations of one packing element, and the broken diagonal lines represent the corrugations of an adjacent packing element.) When placed in the vertical for use in a distillation column the corrugations form an angle ( ) with the horizontal. In addition to being corrugated, the elements or sheets may have surface texture 30 (e.g., lateral or horizontal striations), holes or apertures 28, dimples, grooves, or other features which can enhance the performance of the basic element 20. The corrugations, as illustrated in the sectional view of FIG. 2A, are formed in a wavelike pattern. The two alternating sloping sides of the corrugations form an angle (β), referred to as the "included angle". It is most common for the waves of the corrugations to be nearly triangular in shape, although some finite radius of curvature ("root radius") (r) is present in the folds, as shown in FIG. 2A. A root radius (r) in the range of 0.1 to 3.0 millimeters is preferred, while it is most preferred to have a root radius in the range of 0.3 to 1.0 millimeters.

Figure 4:
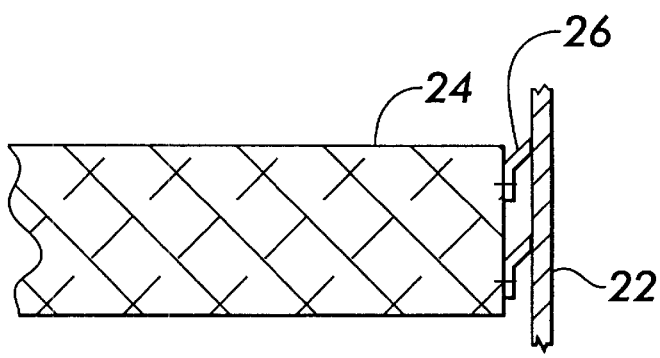
FIG. 4 is a schematic diagram illustrating the use of wall wipers in a packed column.

Using such basic packing elements 20, a "brick" 24 of structured packing is made by assembling the elements (typically about 40 to 50 elements per brick) such that the corrugations of adjacent elements are arranged in the crisscrossing fashion shown in FIG. 3. (The means used to secure the elements in place are not shown.) When the bricks 24 are placed within a cylindrical column 22, the edges of the bricks near the wall are rough and jagged, creating gaps. To reduce liquid bypass, wipers 26 typically are used as shown in FIG. 4.

Figure 5A:
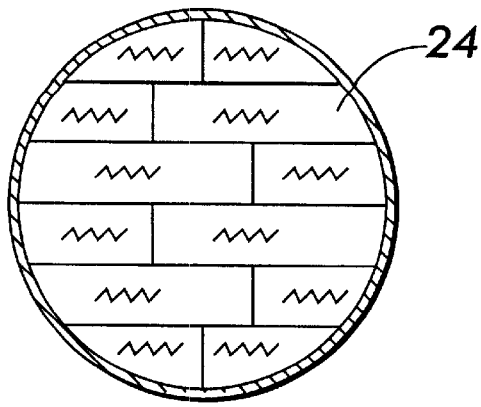
FIG. 5A is a schematic diagram of a plan view of an arrangement of bricks of structured packing at one elevation at a sectional view taken along line 5A—5A in FIG. 5B.
Figure 5B:
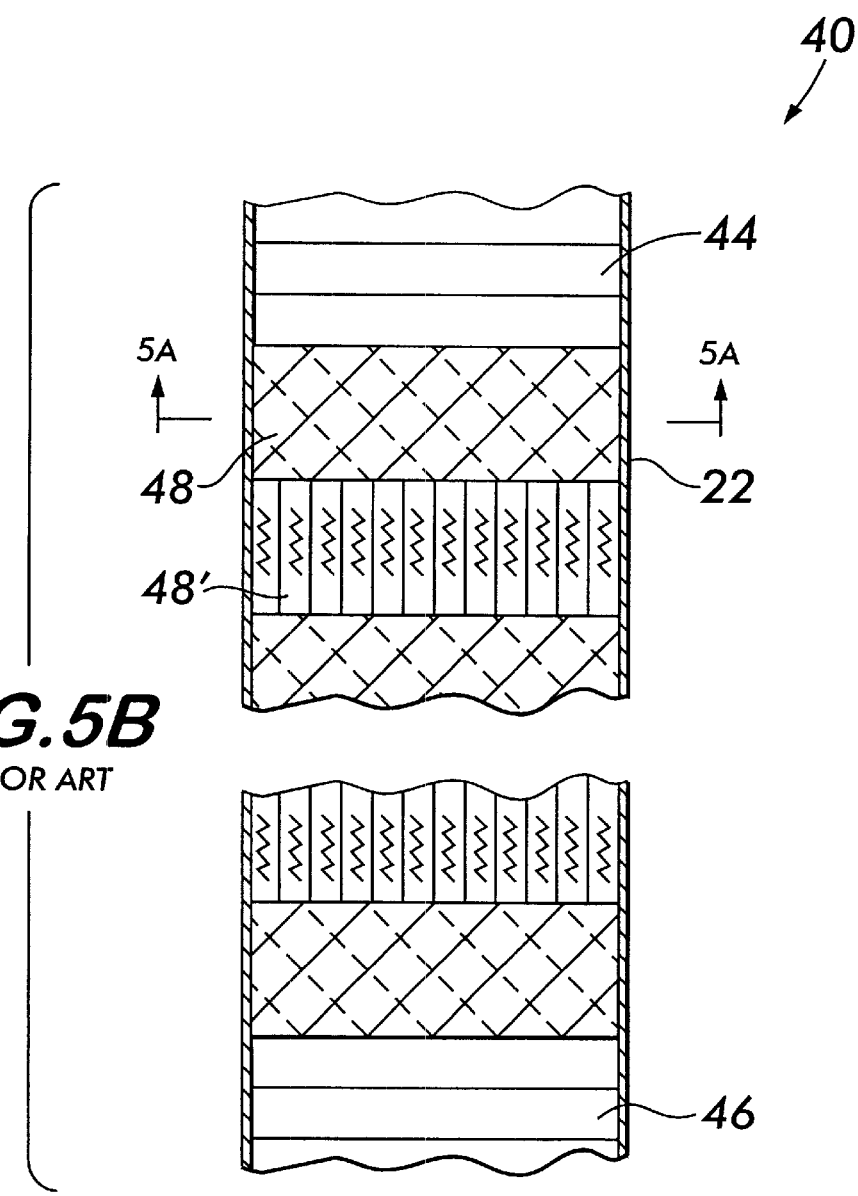
FIG. 5B is a schematic diagram of an elevation view of an arrangement of a plurality of layers of structured packings between liquid and vapor distributors in a section of a distillation column.

Structured packing bricks 24 typically are assembled into layers (48, 48') in a section of a distillation column 40 as shown in FIGS. 5A and 5B. FIG. 5A is a plan view which shows the arrangement of about twelve bricks 24 at one elevation as a sectional view at 5A—5A in FIG. 5B. FIG. 58 shows an elevation view of the entire arrangement of a structured packing column 40 having a plurality of layers (48, 48') in a section between a liquid distributor 44 and a vapor distributor 46, wherein successive layers (48, 48') of packing (typically about 8 inches high per layer) are rotated relative to each other at right angles (i.e., 90°). This is the most common arrangement, but other rotation patterns can be used (e.g., where successive layers are rotated at an angle between about 0° and about 90°).

The current invention works by simultaneously varying at least four parameters which define the geometry and performance of a corrugated structured packing, as opposed to varying one physical parameter or one calculated parameter at a time as taught in the prior art. The parameters varied in the current invention are surface area density (A), the corrugation angle ( ), the included angle (β), aperture size (equivalent diameter), and surface enhancement features such as aperture spacing and surface texture. While these features are discussed individually in the prior art, the importance of the included angle β is not recognized or claimed (except in an indirect manner to adjust loading via the 's' parameter in Dunbobbin et al). In fact, it is a common practice in the prior art to calculate the mass transfer and pressure drop characteristics of structured packing in terms of just A and without specifically accounting for the effect of the included angle β, which is a key parameter in the current invention.

Also, the ranges of the above-identified parameters for the optimal structured packing of the current invention are surprising and unexpected because the combined effects of these parameters are complex and not completely predictable. This is because there is a strong interaction among these parameters which determines the flow characteristics of the vapor and liquid, and thereby the final performance of the structured packing. The surprising and unexpected results of the current invention have been identified through extensive experimental work followed by theoretical modeling work.

For cryogenic applications, the most optimal range of the included angle β is higher than 90 degrees according to the current invention. This is especially surprising because most of the commercial packings used for cryogenic air separation have an included angle βless than 90 degrees. Also, contrary to the teachings of Rohde et al., the most optimal surface area density A is much lower than 1000–1500 $m^2/m^3$. Thus, considerable material cost savings can be realized by the current invention.

According to the present invention, optimal performance in cryogenic applications is achieved by using corrugated packings with surface enhancing features such as apertures and surface texture when the above-identified four parameters are in the following ranges. For surface area density (A), a range of 350–800 $m^2/m^3$ is preferred, while a range of 500–675 $m^2/m^3$ is most preferred. For the corrugation angle ( ), a range of 35–65 degrees is preferred, while a range of 40–60 degrees is most preferred. For the included angle (β), a range of 80–110 degrees is preferred, while a range of 90–100 degrees is most preferred. For apertures, it is preferred to have an equivalent diameter greater than 2 mm but less than 4 mm. (Equivalent diameter is calculated as four times the area of the aperture divided by the perimeter of the aperture.) In the preferred embodiment, the apertures are circular. However, various other shapes of apertures can be used, including but not limited to ovals, oblongs, elliptical holes, tear-drop shaped holes, narrow slit-type holes, triangular holes, rectangular holes, and holes in the shape of other polygons.

The current invention can be applied in many different ways to minimize the overall cost of distillation separation and purification systems, as compared to the limited ways of the prior art teachings. This is accomplished by varying the four independent parameters within the preferred ranges set forth above. For instance, it is possible to minimize the height of a distillation column, or limit its maximum diameter, or minimize its volume and/or weight. While it is not a specific objective of the present invention to obtain a column of constant diameter containing many packed sections as taught by Lockett et al and McKeigue, such a result may be obtained by simultaneously varying at least the four parameters discussed above. Persons skilled in the art will recognize that the present invention also may be used for additional applications, such as extraction or absorption.

Also, when trying to minimize the cost of a distillation column system, the cost of manufacturing should be considered. Thus, it may be advantageous to vary all of the four parameters or to hold several of the parameters constant while varying only one or two or three of the parameters. For instance, all packing may be produced at a constant value of all parameters. Alternatively, different packings may be produced which vary only one parameter, such as the surface area density A or the corrugation angle , while holding the other parameters constant. Also, the four parameters of surface area density A, corrugation angle , included angle β, and aperture size (equivalent diameter) may be changed for every distillation column section while maintaining the surface texture constant. Alternatively, surface texture also may be modified for total flexibility in optimization of performance.

The results achieved by the current invention are surprising and unexpected, and the possible combinations of the four parameters within the preferred ranges can lead to much more optimal solutions than that taught by the prior art. As indicated by the examples discussed below, the achieved results show: (1) a 15% improvement in mass transfer and pressure drop per theoretical stage without giving up any capacity; and (2) a 35% saving in material cost while maintaining the overall height and diameter of a packed section and while retaining the mass transfer and pressure drop performance at identical levels. The magnitude of these improvements (i.e., 15% improvement in performance and 35% saving in material cost) are surprising and unexpected. Whereas persons skilled in the art might expect some (i.e., a few percent) improvement in performance and/or saving in material cost, the results achieved by the current invention far exceed those expectations. In other words, persons skilled in the art would have expected something much less than the results actually achieved by the current invention.

The examples discussed below are provided to illustrate possible uses of the current invention. Other examples can be envisioned by persons skilled in the art. Example 1 shows that the packing of the current invention out performs the "Mellapak 500Y" packing, which is a dominant structured packing used in the air separation industry. ("Mellapak 500Y" is a trademark of Sulzer Chemtech.) Based on laboratory results, there is a 15% improvement in mass transfer and pressure drop per theoretical stage without giving up any capacity.

Example 2 shows a comparison between a structured packing designed at the outer edges of the teachings of the current invention versus one which is optimized according to the current invention. The example demonstrates the unexpected result that compares the performance of a high surface area density packing at the outer edges of the preferred ranges to a packing that is optimized and well inside the preferred ranges taught by the current invention. The example shows that there is a 35% saving in material cost while maintaining the overall height and diameter of a packed section, and while retaining the mass transfer and pressure drop performance at identical levels. This example shows an unexpected benefit in relation to the prior art teachings of Rohde et al., which teaches that the optimum surface area density for cryogenic air separation structured packing is much higher than the prior art. Rohde et al. teaches that surface area density greater than 1000 $m^2/m^3$ is optimum, while the prior art packings fall in the range of 125–700 $m^2/m^3$. Rohde et al. also states that if the low pressure column is already at 1000 $m^2m^3$ and specifically 750 $m^2/m^3$, the argon column may be in the range of 700–900 $m^2/m^3$ and specifically 750 $m^2/m^3$. In contrast, the current invention demonstrates how a packing with $800^2 m^3/m$ surface area can be out performed by an optimal packing which has only 520 $m^2/m^3$, a clear but unexpected benefit according to the teachings of the current invention.

EXAMPLE 1

FIG. 6 and the table below show how simultaneously varying the four parameters as taught by the current invention leads to an optimal structured packing in cryogenic air separation compared to Mellapak 500Y, one of the most commonly used structured packings in the industry. Cryogenic experiments were performed in a laboratory distillation column. Eight packing layers, approximately eight (8) inches in diameter and height each, were placed on top of each other inside the column wherein successive layers were rotated relative to each other at 90°. The overall packed section had a diameter of about eight (8) inches and a total height of about sixty-five (65) inches. The column was operated to itr perform separation of a binary argon/oxygen mixture at a pressure of 30 psia and under total internal flux. This made the liquid to vapor flow ratio within the column, commonly referred to as the L/V ratio, equal to 1. After reaching steady state at a variety of flow conditions, the data were reduced for each packing as follows. The total separation obtained was calculated from the composition of mixtures at the top and bottom of the column. This was converted to the number of theoretical stages obtained. As the total height used was sixty-five (65) inches, a value for the height equivalent to a theoretical plate (HETP) was obtained. The data were reported with respect to the vapor velocity $K_v$, which is defined as follows:

$$K_v = U_v [\rho_v/(\rho_l - \rho_v)]^{0.5}$$

Where $U_v$=superficial velocity of the vapor phase in the packed section $\rho_v$=density of the vapor phase $\rho_l$=density of the liquid phase.

As seen in FIG. 6 and the table below, the packing according to the current invention shows a 15% improvement in mass transfer performance (reduction in HETP) while maintaining the same pressure drop per foot of packing, within a broad operating $K_v$, range of 0.14–0.22 ft/sec. When applied to a commercial distillation column application, this would translate into a 15% improvement in mass transfer and pressure drop per theoretical stage while maintaining the column's capacity. Stated differently, this means that a packed section according to the current invention, while using the same diameter as the prior art, only needs to be 85% as tall. And at the same time, there will be a corresponding decrease in pressure drop over the packed section by 15% because less height is used compared to the prior art. The mechanical differences (and similarities) between the packings are as stated below. The four main parameters combine in an unexpected manner to produce a 15% improvement over the prior art.

| Type of packing | Mellapak 500Y | Current Invention |
|---|---|---|
| Surface area density, m²/m³ | 500 | 635 |
| Corrugation angle α, degrees | 48 | 57 |
| Included angle β, degrees | 75 | 97 |
| Apenture diameter, mm | 4 | 2.4 |
| Open area, % | 10 | 10 |
| Surface texture | Lateral striations | Lateral striations |
| Relative capacity | 1b05480703.03 | 1.0 |
| .0 | | |
| Relative dP/ft | 1.0 | 1.0 |
| Relative dP/stage | 1.0 | 0.85 |
| Relative HETP | 1.0 | 0.85 |

EXAMPLE 2

This example shows another surprising and unexpected result. As previously discussed, Rohde et al teaches high surface area density as optimum for structured packing used in cryogenic air separation. Applicants have found that the performance of high surface area density packing can be matched by much lower surface area density packing without losing performance at a considerable material savings. Based on extensive experimental work conducted in the distillation column system described in Example 1, the estimates in the table below were made.

Two packings were compared for the separation of a binary mixture of argon/oxygen at a pressure of 18 psia and a $K_v$, of 0.175 ft/sec. A prior art packing was considered at the limits of the preferred ranges taught by the current invention. Thus, the highest surface area density of 800 m²/m³ was chosen. Simultaneously, the highest corrugation angle ( ) of 65 degrees and the lowest included angle (β) of 80 degrees also were chosen in order to have a reasonable pressure drop of 0.32 inch of water per foot. The prior art packing had 4 mm holes with an open area of 10%. According to the current invention, the performance can be matched by using a packing having a surface area density of only 520 m²/m³ with the other parameters as shown in the table below. Two distillation column packed sections of identical diameter and height containing these two types of packings and operating under these conditions will produce identical mass transfer and pressure drop results. But since there is a 35% reduction in the amount of metal used, there is a substantial savings in terms of the packed section weight and the overall system cost. This is a highly unexpected result. Also, it is known that high surface area density packings have very poor turndown capabilities, whereas good turndown capabilities are a significant requirement for modern air separation plants. The use of proportionately lower surface area densities, as taught by the current invention, leads to a significantly improved turndown capability, in addition to the advantages stated earlier in terms of weight and cost.

| Type of packing | Prior Art | Current Invention |
|---|---|---|
| Surface area density, m²/m³ | 800 | 520 |
| Corrugation angle α, degrees | 65 | 46 |
| Included angle β, degrees | 80 | 93 |
| Aperture diameter, mm | 4 | 2.4 |
| Open area, % | 10 | 10 |
| Surface texture | Lateral striations | Lateral striations |
| HETP, inch | 5.80 | 5.80 |
| dP/ft, inch of water | 0.32 | 0.32 |

Further, it is estimated that if the prior art example has an included angle (β) of 95 degrees instead of 80 degrees, which will move it from the edge of the preferred range taught in the current invention to the middle of that range, an equivalent packing can still be found which will have a surface area density of only 600 m²/m³, which is still a substantial saving over the prior art and also will retain most of the turndown advantage.

The above examples illustrate the benefits of using corrugated structured packing having parameters that are within the preferred ranges taught by the current invention. The examples are not meant to be exclusive or restrictive. Although these examples refer to argon/oxygen separation near atmospheric pressure, the current invention applies to all cryogenic systems which can operate in a wide pressure range. This invention will be particularly useful in all of the distillation column sections of an air separation plant. This includes, but is not limited to, what are commonly referred to as the high pressure column, the low pressure column, the crude argon column, and the pure argon column.

Other variations and extensions of these concepts will be obvious to persons skilled in the art. For example, variations could include extraction and absorption. This general technique also may be applied to any heat and mass exchange column which has counter flowing liquid and vapor (or gas phases). The present invention also is not limited to distillation or cryogenic distillation applications.

Various embodiments of the present invention have been described with particular reference to the examples discussed above. However, it should be appreciated that variations and modifications may be made to those embodiments and examples without departing from the spirit and scope of the invention as defined in the appended claims.

What is claimed is:

1. A structured packing having a surface area density in the range of about 350 $m^2/m^3$ to about 800 $m^2/m^3$, comprising a plurality of corrugated plates disposed in vertically parallel relation, each plate having at least one aperture and a plurality of regularly spaced and substantially parallel corrugations disposed in crisscrossing relation to the corrugations of an adjacent plate, wherein the apertures have an equivalent diameter less than about 4 millimeters but greater than about 2 millimeters, and wherein the corrugations have a corrugation angle ( ) relative to horizontal in the range of about 35° to about 65° and each corrugation, when approximated to be a substantially triangular cross-section, has an included angle ($\beta$) defined by two sides of the corrugation in the range of about 80° to about 110°.

2. A structured packing having a surface area density in the range of about 500 $m^2/m^3$ to about 675 $m^2/m^3$, comprising a plurality of corrugated plates disposed in vertically parallel relation, each plate having at least one aperture and a plurality of regularly spaced and substantially parallel corrugations disposed in crisscrossing relation to the corrugations of an adjacent plate, wherein the apertures have an equivalent diameter less than about 4 millimeters but greater than about 2 millimeters, and wherein the corrugations have a corrugation angle ( ) relative to horizontal in the range of about 40° to about 60° and each corrugation, when approximated to be a substantially triangular cross-section, has an included angle ($\beta$) defined by two sides of the corrugation in the range of about 90° to about 100°.

3. A structured packing as in claim 1 further comprising a surface texture applied on at least a portion of the surface of at least one corrugated plate.

4. A structured packing as in claim 3, wherein the surface texture is in the form of horizontal striations.

5. A structured packing as in claim 3, wherein the surface texture is a bidirectional surface texture in the form of fine grooves in crisscrossing relation.

6. A structured packing as in claim 1 wherein the apertures create open area in each plate in the range of about 5% to about 20% of the total area of the plate.

7. A structured packing as in claim 1 wherein the apertures create open area in each plate in the range of about 8% to about 12% of the total area of the plate.

8. A structured packing as in claim 2 wherein the apertures create open area in each plate in the range of about 5% to about 20% of the total area of the plate.

9. A structured packing as in claim 2 wherein the apertures create open area in each plate in the range of about 8% to about 12% of the total area of the plate.

10. A structured packing having a surface area density in the range of about 350 $m^2/m^3$ to about 800 $m^2/m^3$, comprising a plurality of corrugated plates disposed in vertically parallel relation, each plate having at least one aperture and a plurality of regularly spaced and substantially parallel corrugations disposed in crisscrossing relation to the corrugations of an adjacent plate, wherein the apertures have an equivalent diameter less than about 4 millimeters but greater than about 2 millimeters, and wherein the corrugations have a corrugation angle ( ) relative to horizontal in the range of about 35 to about 65° and each corrugation, when approximated to be a substantially triangular cross-section, has an included angle ($\beta$) defined by two sides of the corrugation in the range of about 80° to about 110°, and wherein at least one corrugation has a root radius (r) in the range of about 0.1 mm to about 3.0 mm.

11. A structured packing having a surface area density in the range of about 350 $m^2m^3$ to about 800 $m^2/m^3$, comprising a plurality of corrugated plates disposed in vertically parallel relation, each plate having at least one aperture and a plurality of regularly spaced and substantially parallel corrugations disposed in crisscrossing relation to the corrugations of an adjacent plate, wherein the apertures have an equivalent diameter less than about 4 millimeters but greater than about 2 millimeters, and wherein the corrugations have a corrugation angle ( ) relative to horizontal in the range of about 35° to about 65° and each corrugation, when approximated to be a substantially triangular cross-section, has an included angle ($\beta$) defined by two sides of the corrugation in the range of about 80° to about 110°, and wherein at least one corrugation has a root radius (r) in the range of about 0.3 mm to about 1.0 mm.

12. An exchange column for exchanging heat and/or mass between a first phase and a second phase, the exchange column having at least one structured packing as in claim 1.

13. A packed section in an exchange column, comprising:
   a first layer of a structured packing as in claim 1; and
   a second layer of a structured packing as in claim 1 located below the first layer of structured packing, wherein the second layer is rotated at an angle relative to the first layer.

14. A packed section as in claim 13 wherein the angle is between about 0° and about 90°.

15. A structured packing having a surface area density in the range of about 500 $m^2/m^3$ to about 675 $m^2/m^3$, comprising a plurality of corrugated plates disposed in vertically parallel relation, each plate having a plurality of regularly spaced and substantially parallel corrugations disposed in crisscrossing relation to the corrugations of an adjacent plate, and wherein the corrugations have a corrugation angle ( ) relative to horizontal in the range of about 40° to about 60° and each corrugation, when approximated to be a substantially triangular cross-section, has an included angle ($\beta$) defined by two sides of the corrugation in the range of about 90° to about 100°, and wherein at least one corrugation has a root radius (r) in the range of about 0.1 millimeters to about 3.0 millimeters.

16. A structured packing as in claim 15, wherein the root radius (r) is in the range of about 0.3 millimeters to about 1.0 millimeters.

17. An exchange column for exchanging heat and/or mass between a first phase and a second phase, the exchange column having at least one structured packing as in claim 15.

* * * * *

UNITED STATES PATENT AND TRADEMARK OFFICE
CERTIFICATE OF CORRECTION

PATENT NO. : 6,357,728 B1
DATED : March 19, 2002
INVENTOR(S) : Sunder et al.

It is certified that error appears in the above-identified patent and that said Letters Patent is hereby corrected as shown below:

Title page,
ABSTRACT, delete "( )" and substitute therefor -- ($\propto$) -- in the following locations:

Column 3,
Line 46, delete "( )" and substitute therefor -- ($\propto$) --

Column 4,
Line 34, delete "( )" and substitute therefor -- ($\propto$) --

Column 5,
Line 39, delete "( )" and substitute therefor -- ($\propto$) --

Column 6,
Line 2, delete "( )" and substitute therefor -- ($\propto$) --
Line 64, delete "( )" and substitute therefor -- ($\propto$) --

Column 8,
Line 5, delete "( )" and substitute therefor -- ($\propto$) --
Line 13, delete "( )" and substitute therefor -- ($\propto$) --
Line 58, delete "( )" and substitute therefor -- ($\propto$) --

Column 9,
Line 30, delete "( )" and substitute therefor -- ($\propto$) --

Column 12,
Line 13, delete "( )" and substitute therefor -- ($\propto$) --

Column 13,
Line 22, delete "( )" and substitute therefor -- ($\propto$) --
Line 36, delete "( )" and substitute therefor -- ($\propto$) --

UNITED STATES PATENT AND TRADEMARK OFFICE
CERTIFICATE OF CORRECTION

PATENT NO. : 6,357,728 B1
DATED : March 19, 2002
INVENTOR(S) : Sunder et al.

It is certified that error appears in the above-identified patent and that said Letters Patent is hereby corrected as shown below:

Column 14,
Line 7, delete "( )" and substitute therefor -- ($\propto$) --
Line 23, delete "( )" and substitute therefor -- ($\propto$) --
Line 48, delete "( )" and substitute therefor -- ($\propto$) --

Signed and Sealed this

Twenty-eighth Day of May, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,357,728 B1
DATED : March 19, 2002
INVENTOR(S) : Sunder et al.

It is certified that error appears in the above-identified patent and that said Letters Patent is hereby corrected as shown below:

<u>Column 3,</u>
Line 49, delete "90° ]" and substitute therefore -- 90°-] --

<u>Column 11,</u>
Lines 48 thru 61,
Delete the table in its entirety and substitute therefore

| Type of Packing | Mellapak 500Y | Current Invention |
|---|---|---|
| Surface area density, $m^2/m^3$ | 500 | 635 |
| Corrugation angle $\alpha$, degrees | 48 | 57 |
| Included angle $\beta$, degrees | 75 | 97 |
| Aperture diameter, mm | 4 | 2.4 |
| Open area, % | 10 | 10 |
| Surface texture | Lateral striations | Lateral striations |
| Reactive capacity | 1.0 | 1.0 |
| Relative dP/ft | 1.0 | 1.0 |
| Relative dP/stage | 1.0 | 0.85 |
| Relative HETP | 1.0 | 0.85 |

Signed and Sealed this

Third Day of September, 2002

*Attest:*

*Attesting Officer*

JAMES E. ROGAN
*Director of the United States Patent and Trademark Office*